United States Patent
Schertenleib et al.

(10) Patent No.: US 12,523,572 B2
(45) Date of Patent: Jan. 13, 2026

(54) TEST STAND FOR TESTING BOGIES OF RAIL VEHICLES

(71) Applicant: Nencki AG, Langenthal (CH)

(72) Inventors: Thomas Schertenleib, Langenthal (CH); Hans Borer, Lohn-Ammannsegg (CH)

(73) Assignee: Nencki AG, Langenthal (CH)

( * ) Notice: Subject to any disclaimer, the term of this patent is extended or adjusted under 35 U.S.C. 154(b) by 298 days.

(21) Appl. No.: 18/266,535

(22) PCT Filed: Dec. 10, 2020

(86) PCT No.: PCT/EP2020/085560
§ 371 (c)(1),
(2) Date: Jun. 9, 2023

(87) PCT Pub. No.: WO2022/122162
PCT Pub. Date: Jun. 16, 2022

(65) Prior Publication Data
US 2024/0053232 A1    Feb. 15, 2024

(51) Int. Cl.
G01M 17/10    (2006.01)

(52) U.S. Cl.
CPC .................................... *G01M 17/10* (2013.01)

(58) Field of Classification Search
CPC ....................................................... G01M 17/10
See application file for complete search history.

(56) References Cited

U.S. PATENT DOCUMENTS

| | | | | |
|---|---|---|---|---|
| 5,375,464 A * | 12/1994 | Dadt | ................... | G01M 17/065 73/146 |
| 6,725,782 B1 * | 4/2004 | Bloom | ................... | E01B 35/00 105/157.1 |
| 7,401,520 B2 * | 7/2008 | Parison | ............... | G01M 17/007 73/669 |
| 12,306,143 B1 * | 5/2025 | Wang | ....................... | G01N 3/56 |
| 2002/0040600 A1 * | 4/2002 | Lenzen | .................... | B66F 7/10 73/432.1 |
| 2010/0270029 A1 | 10/2010 | Ramsey | | |

(Continued)

FOREIGN PATENT DOCUMENTS

| | | |
|---|---|---|
| CN | 201145641 Y | 11/2008 |
| CN | 101865783 A | 10/2010 |

(Continued)

OTHER PUBLICATIONS

DE102009002678A1 English language machine translation.
(Continued)

*Primary Examiner* — Eric S. McCall
(74) *Attorney, Agent, or Firm* — Lerner David LLP

(57) ABSTRACT

A test stand for testing bogies of rail vehicles is described herein. The test stand includes a load application unit for generating a linear application force for a bogie to be tested. The load application unit includes a hydraulic cylinder with a piston rod. The hydraulic cylinder is a double-acting cylinder, the cylinder chambers of which are pressurized with hydraulic fluid by a bi-directional axial piston pump. The test stand further includes a transmission unit for transmitting the application force to the bogie, the transmission unit being operatively connected to one end of the piston rod.

10 Claims, 3 Drawing Sheets

(56) References Cited

U.S. PATENT DOCUMENTS

| | | | | |
|---|---|---|---|---|
| 2012/0042720 | A1* | 2/2012 | Bastian | G01M 17/10 |
| | | | | 73/115.07 |
| 2013/0199284 | A1* | 8/2013 | Clusserath | G01M 17/007 |
| | | | | 73/116.01 |
| 2016/0282225 | A1 | 9/2016 | Keisokuki | |
| 2022/0074815 | A1* | 3/2022 | Monahan | F01D 25/34 |
| 2024/0085277 | A1* | 3/2024 | Borer | G01M 17/10 |
| 2024/0241015 | A1* | 7/2024 | Matsumoto | G01M 17/10 |

FOREIGN PATENT DOCUMENTS

| | | |
|---|---|---|
| CN | 201876366 U | 6/2011 |
| CN | 202305239 U | 7/2012 |
| CN | 104236936 A | 12/2014 |
| CN | 111024418 A | 4/2020 |
| DE | 102009002678 A1 | 10/2010 |
| DE | 102015101161 B3 | 5/2016 |
| JP | 2009137425 A | 6/2009 |
| KR | 101773821 B1 | 9/2017 |

OTHER PUBLICATIONS

KR101773821B1 English language machine translation.
CN101865783A English language machine translation.
CN111024418A English language machine translation.
Search Report from the Office Action for Chinese Application No. 202080107640.6 issued Aug. 13, 2024, 3 pages. (see p. 1-2, categorizing the cited references).
International Search Report for Application No. PCT/EP2020/085560 mailed Sep. 6, 2023. 4 pgs.

* cited by examiner

TEST STAND FOR TESTING BOGIES OF RAIL VEHICLES

CROSS REFERENCE TO RELATED APPLICATIONS

This application is a national phase application of International Application No. PCT/EP2020/085560, filed Dec. 10, 2020 the content of which is herein incorporated by reference.

BACKGROUND OF THE INVENTION

Field of the Invention

The invention relates to a test stand for testing bogies of rail vehicles, comprising a load application unit for generating a linear application force for a bogie to be tested, comprising a hydraulic cylinder with a piston rod and a transmission unit for transmitting the application force to the bogie, the transmission unit being operatively connected to one end of the piston rod. The invention further relates to a method for testing bogies.

Description of Related Art

A bogie test stand is used to measure and test various parameters of rail vehicle bogies. In particular, forces are applied to the bogie along a linear axis or several linear axes by means of a load application unit in order to simulate the impact forces to be expected in operation due to the vehicle weight and static and dynamic influences. Various functions and parameters, e.g. wheel loads, axle distances, deflection, etc., are then tested or determined. Depending on the equipment of the test stand, it is possible to test the axle distance, axle parallelism, suspension, wheel runout, wheel diameter, etc. fully automatically.

After the test, all values are stored in a database and can be printed out as a test report. The data can be transferred to a higher-level system.

To enable different bogie models to be tested, such as engine and running bogies, different track gauges, 2-axle and 3-axle bogies, the relevant dimensions of the test stand can be adapted to the different requirements by adjusting individual components manually or automatically.

The load application unit exerts linear forces on the bogie, usually forces directed vertically downwards. For this purpose, a defined position is approached by means of direct path measurement. Subsequently, the force setpoint is approached in a force-controlled manner. As a rule, two load application units are provided, which are arranged on a crossbeam so as to be movable relative to each other along a horizontal axis for adaptation to different bogie dimensions or geometries. In this way, forces can be simulated as they occur, for example, when driving through curves.

Known load application units include hydraulic or electric load cylinders. Hydraulic load cylinders are designed, for example, as differential hydraulic cylinders and include a servo valve. They are controlled via an industrial PC, for example. Such hydraulic cylinders are sensitive to lateral forces acting on the piston rod. A so-called auxiliary yoke is therefore usually provided to absorb transverse forces. Accordingly, despite the fact that hydraulic cylinders are actually inexpensive, this results in relatively high costs for the overall design. Maintenance and servicing costs are also relatively high.

Electric load cylinders are an alternative. They are designed, for example, as screw jacks with ball screw drives. They are driven by a synchronous motor, which is usually controlled by a specific drive amplifier. However, such drives and corresponding spare parts are comparatively expensive.

Both hydraulic and electric load cylinders also require a relatively large amount of (electrical) energy during operation.

BRIEF SUMMARY OF THE INVENTION

The task of the invention is to provide a test stand for testing bogies, belonging to the technical field mentioned at the beginning, which is cost- and energy-efficient.

The solution of the task is defined by the features of claim 1. According to the invention, the load application unit of the test stand comprises a hydraulic cylinder with a piston rod, wherein the hydraulic cylinder is a double-acting cylinder, the cylinder chambers of which are pressurized with hydraulic fluid by a bi-directional axial piston pump.

In the simplest case, the transmission unit is the end face of the piston rod. This can also carry a transmission piece. More complicated transmission units can also be used which, for example, distribute the force of the load application unit in a desired manner to an application surface and/or several application surfaces on the bogie. The transmission unit can act directly on the bogie or on transmission elements specifically arranged on the bogie for the test.

Axial piston pumps are available which have very low internal leakage and can be operated at very low speeds. This results in high efficiency: the energy required to drive the pump can largely be converted into work output of the hydraulic cylinder. This results in low energy costs.

Compared with electric load cylinders, the manufacturing costs are also low. Compared with hydraulic load cylinders, this results in significantly higher possible dynamics in operation, which—as described below—is advantageous for certain applications in the context of a bogie test stand.

Advantageously, the axial piston pump includes a swash plate, which cooperates on both sides with several pistons each. Such pumps are available from Bucher Hydraulics, Klettgau-Griessen, Germany, for example, under the type designation AXFM. They are 4-quadrant pumps that can be operated at speeds of less than 1 rpm. They are also characterized by particularly low internal leakage. These pumps were originally proposed for use in battery-powered mobile machinery (e.g. in the mining sector).

Advantageously, the axial piston pump and the hydraulic cylinder together with a compensating reservoir form a closed hydraulic system. The compensating reservoir (pressure accumulator) is used to compensate for any leaks and to vent the system. The closed system results in a simple and compact design with a minimum number of components. The manufacturing and maintenance costs are reduced accordingly.

Further components can be provided in the closed hydraulic system, in particular pressure relief, regulating and control valves.

Advantageously, the piston rod extends on both sides of the piston and is always supported at both longitudinal ends of the cylinder housing, regardless of an extension state.

This means that, unlike previous hydraulic cylinders, an auxiliary yoke is not required to absorb the transverse forces acting on the cylinder when it is extended. This results in reduced manufacturing costs.

In addition, the hydraulic cylinder can thus be designed as a synchronized cylinder in which the entire volume of the hydraulic fluid can be used as a pendulum volume.

The axial piston pump is driven in particular by a servomotor. Preferably, this is a synchronous motor that drives the pump directly. Such motors are durable and enable precise and energy-efficient operation. Alternatively, it is possible to use asynchronous motors or DC motors. It is also possible in principle to use a motor, e.g. a three-phase motor with frequency converter, together with a separate encoder.

Particularly preferably, the load application unit of the test stand according to the invention thus comprises
- a double-acting hydraulic cylinder with a continuous piston rod that is always supported at both longitudinal ends of the cylinder housing, regardless of the extension state,
- a bi-directional axial piston pump that enables 4-quadrant operation and functions in particular at low speeds, whereby the two cylinder chambers of the hydraulic cylinder are pressurized with hydraulic fluid by the axial piston pump,
- a compensating reservoir, which forms a closed hydraulic system with the hydraulic cylinder and the axial piston pump, and
- an electric motor to drive the axial piston pump.

Compared with known load application units with hydraulic or electric load cylinders, in addition to low maintenance and spare parts costs, such a load application unit has advantages in terms of energy consumption and noise, as will be explained in more detail below.

Advantageously, a length measuring device and a force measuring device are arranged on the hydraulic cylinder, and a drive control device is provided which is connected to the length measuring device and the force measuring device for receiving measuring signals and to the servomotor for transmitting control signals. The drive control device is controlled in such a way that the control signals are generated as a function of the measurement signals.

Due to the servo drive, the load application unit of the test stand according to the invention can be controlled precisely and with a very short reaction time, which in particular also enables tests in which rapidly changing effects on the bogie are simulated.

In the bogie test stand according to the invention, in particular two load application units for generating vertical application forces are arranged on a cross member so as to be displaceable relative to one another along a horizontal axis. This makes it possible to simulate forces such as those that occur when driving through curves or other unilateral loads on the bogie. In combination with the aforementioned fast control, this results in a high degree of freedom in defining the test cycles.

The invention also relates to a method for testing bogies in which, prior to a testing step, the bogie is deflected in and out several times by application forces of a load application unit in order to condition spring and/or damper elements for the test. The testing step can comprise several substeps, e.g. a first substep or a first group of substeps for testing the bogie geometry and a second substep or a second group of substeps for testing the suspension. Conditioning is particularly advantageous with regard to testing bogies with spring and/or damper elements made of elastomeric materials, e.g. natural or synthetic rubber-based materials. It is used to bring such elements to a realistic operating temperature that corresponds to the conditions in which the bogie is used in operation.

The bogie test stand according to the invention is particularly well suited for carrying out this procedure because the force application can be changed with high dynamics. Accordingly, high frequencies of deflection and compression are possible, which considerably reduces the time required for conditioning.

Thus, the springing in and out preferably takes place at a frequency of 1 Hz or more. This allows the corresponding elements to be conditioned within a short time, and the duration of the test cycle is not significantly extended by the conditioning. Moreover, when conditioning at such frequencies, intermediate cooling of the elements is of no significance.

To ensure sufficient conditioning prior to the testing step, preferably at least 10 spring-in and spring-out operations are performed.

During at least part of the conditioning process, the forces acting on the spring in and spring out are at least 70% of the maximum forces acting on the subsequent test step(s).

The possible use of the device according to the invention is of course not limited to the specific procedure with preconditioning. It also has advantages for use in conventional test procedures where preconditioning of bogie elements is not necessary or not desired, for example.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The following is an advantageous embodiment of the invention with reference to the accompanying figures, wherein.

In principle, the same parts are given the same reference signs in the figures.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including not only one of A, only one of B, only one of C, or any combination of A, B, and C.

Figure 1:
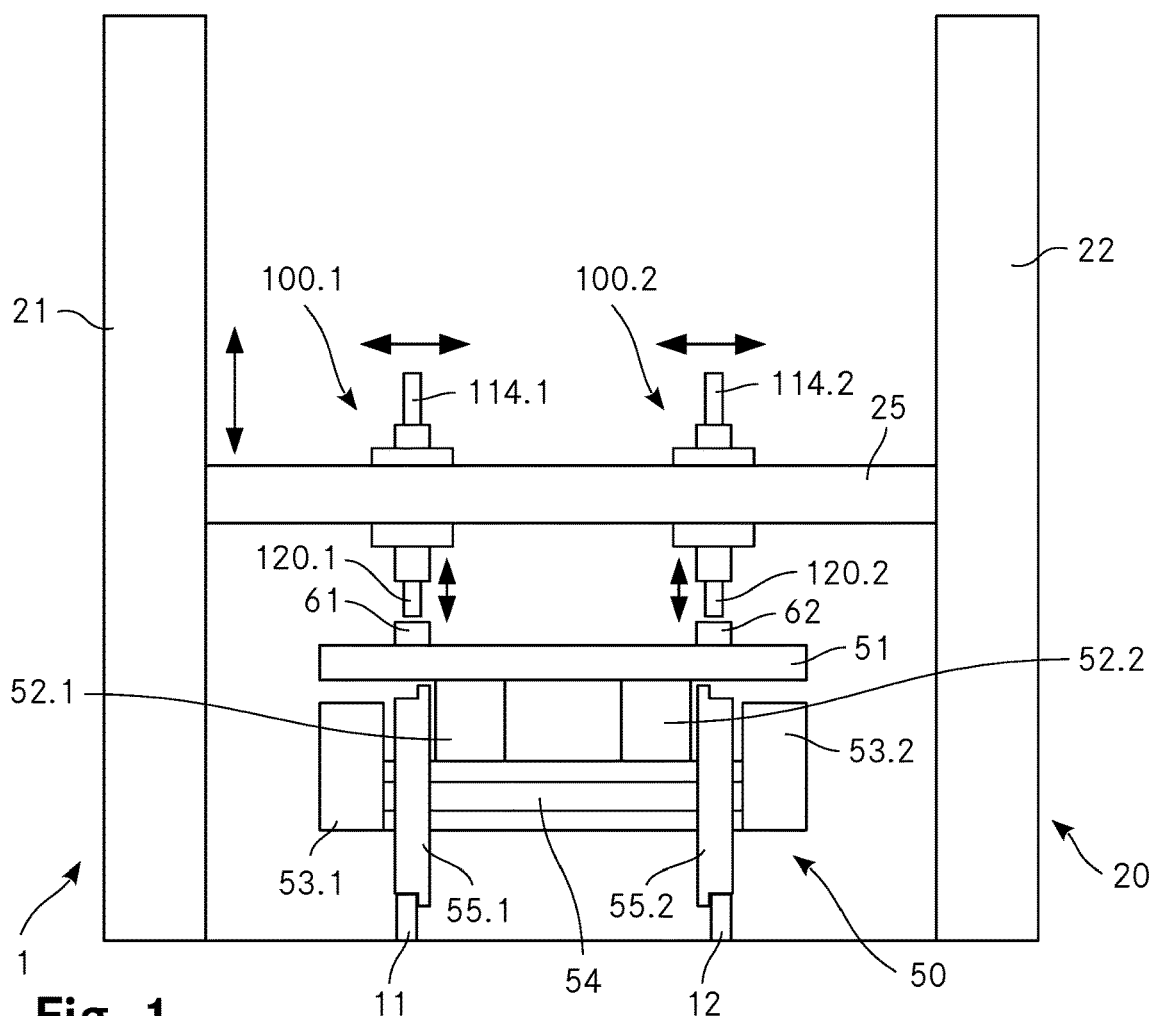
FIG. 1 depicts a schematic front view of a bogie test rig according to the invention.
Figure 2:
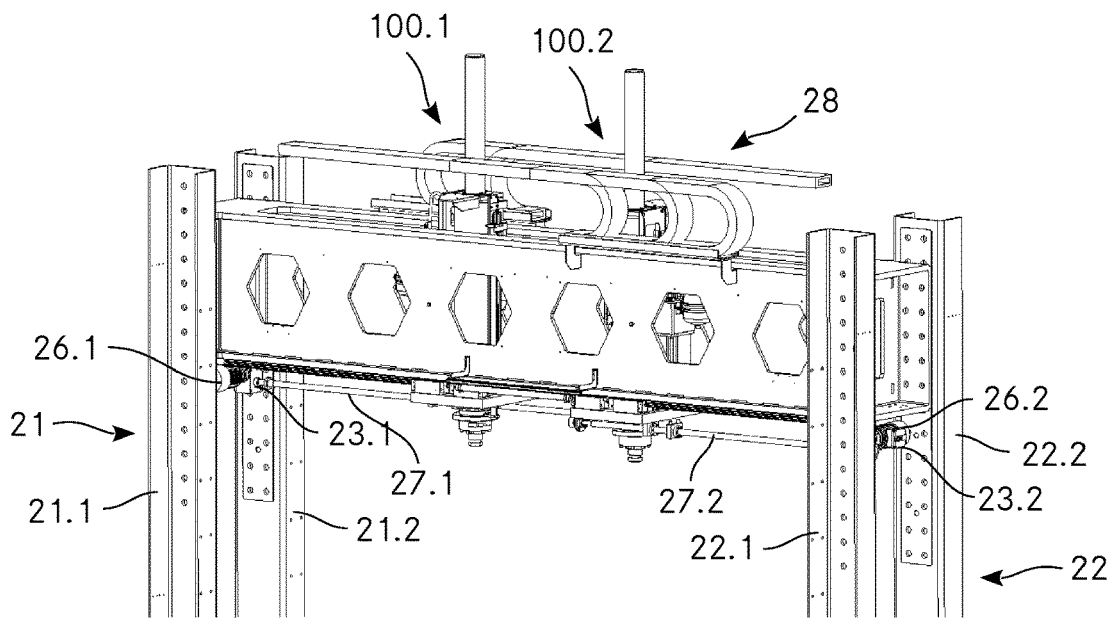
FIG. 2 depicts an oblique view of the cross member of the bogie test rig with load application units arranged on it.

FIG. 1 shows a schematic front view of a bogie test stand according to the invention. FIG. 2 shows an oblique view of the cross member of the bogie test stand with load application units arranged thereon. The test stand 1 comprises supports 11, 12 for a bogie 50, which can be designed in a rail-like manner for the wheels of a track or as separate units. The test stand 1 further comprises a portal 20 with two supports 21, 22, on which a cross member 25 is mounted so as to be vertically displaceable along a linear guide. Each of the supports 21, 22 comprises two vertical beams 21.1, 21.2; 22.1, 22.2, which are arranged parallel to each other. The outer ends of the cross member 25 move in the space between the respective vertical beams 21.1, 21.2; 22.1, 22.2. The linear guide comprises vertical rails and in each case a carriage 23.1, 23.2 movable thereon, to which the cross member 25 is attached. A drive motor 26.1, 26.2 for a spindle 27.1, 27.2 is arranged on each of the carriages 23.1, 23.2. The two spindles 27.1, 27.2 run horizontally inwards from the respective carriage 23.1, 23.2, parallel to the cross member 25, and serve for the transverse adjustment of two load application units 100.1, 100.2 arranged on the cross member 25 via a further linear guide. The load application units 100.1, 100.2 are of identical design. They are described in more detail below, in connection with FIGS. 3-5. The cross member 25 further comprises a supply arrangement 28 with drag chains for supplying electrical power and control signals to the load application units 100.1, 100.2. Sensor signals from sensors arranged on the load application units 100.1, 100.2 are also transmitted to a control and/or evaluation station via the drag chains of the supply arrangement 28.

The bogie 50 is shown only schematically in FIG. 1. It comprises a bogie frame 51 on which the wheel axle 54 is mounted with the wheels 55.1, 55.2 of the bogie 50 via secondary springs 52.1, 52.2 and wheel bearings 53.1, 53.2 with primary suspension.

At the lower end of piston rods 114.1, 114.2 of the load application units 100.1, 100.2, transmission pieces 120.1, 120.2 are arranged, interacting with two points of application 61, 62 on the bogie 50. In the example shown, the points of application 61, 62 are located longitudinally centrally on the bogie frame and transversely each in a plane defined approximately by the center of the treads of the wheels of the corresponding side.

The forces exerted on the bogie 50 by the two load application units 100.1, 100.2 can be controlled independently of each other. Thus, both symmetrical and asymmetrical forces can be exerted on the bogie 50 in the transverse direction. By means of suitable measuring devices known per se, the reaction of the bogie 50 to the application forces can be recorded.

Figure 3:
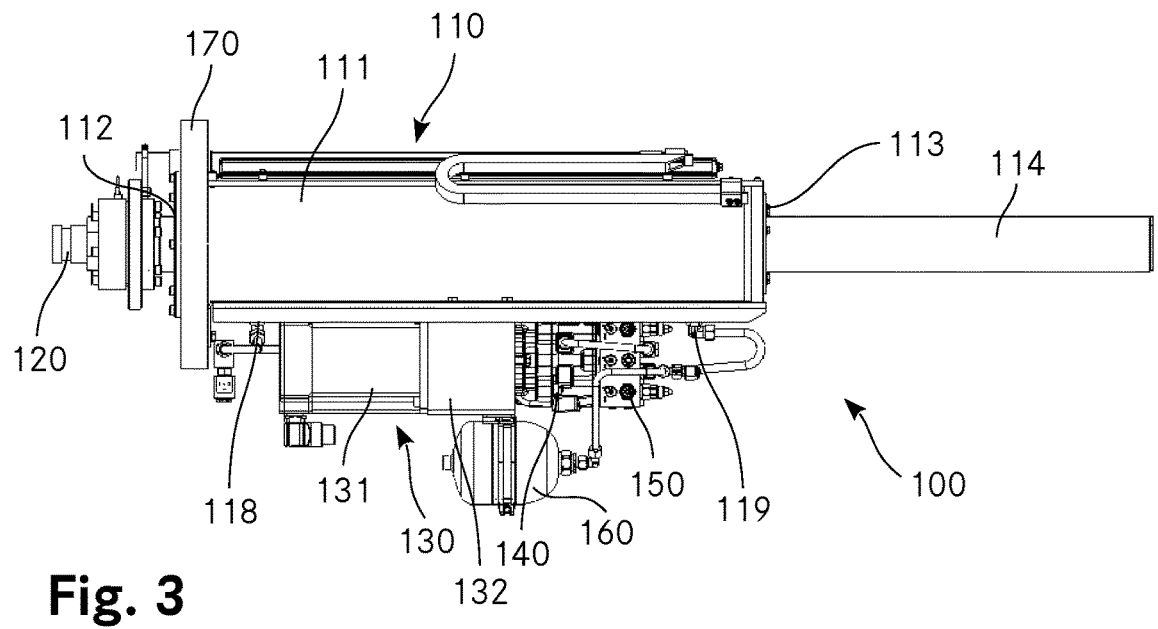
FIG. 3 depicts a side view of a load application unit according to the invention.
Figure 4:
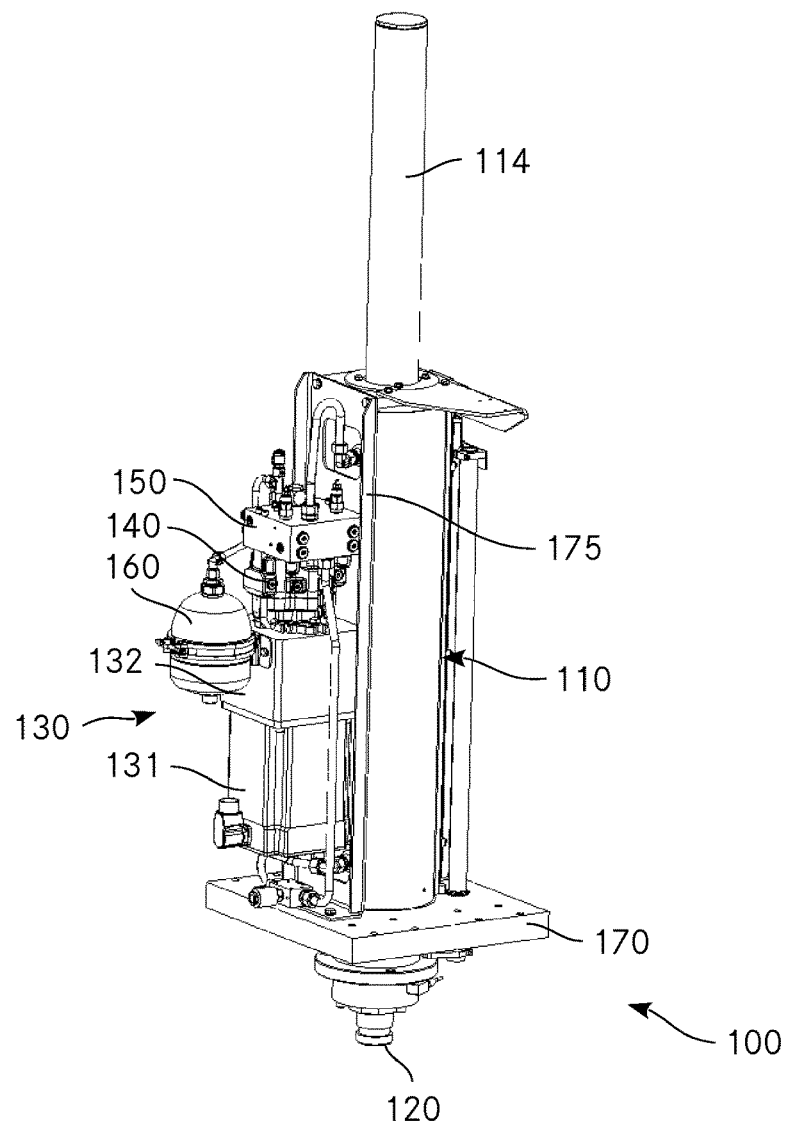
FIG. 4 depicts an oblique view of the load application unit.

FIG. 3 is a side view of a load application unit according to the invention, FIG. 4 shows an oblique view of the same. The load application unit 100 comprises a hydraulic cylinder 110 with a cylinder housing 111 in which a piston rod 114 with a piston 115 (cf. FIG. 5) is sealingly mounted via bearings 112, 113 arranged axially at the ends. A cylinder chamber 116, 117 is formed on both sides of the piston. A transmission piece 120 is fixedly arranged at one of the free ends of the piston 115. The cylinder housing 111 also has two connections 118, 119, each of which opens into one of the cylinder chambers 116, 117. The cross-section of the cylinder housing 111 is constant, so that the hydraulic cylinder 110 functions as a constant-speed cylinder.

The load application unit 100 also has a drive part 130, which is mounted on a base plate 170 together with the hydraulic cylinder 110. The drive part 130 comprises a servomotor 131, to the output end of which a pump carrier 132 is flange-mounted. An axial piston pump 140 is in turn flange-mounted to this pump carrier 132. This pump is driven directly by the servomotor 131 via a coupling. Finally, the axial piston pump 140 carries a valve block 150. The above-mentioned flange-mounted components, together with a compensating reservoir 160, which is designed as a tank for the hydraulic fluid, are mounted on an L-shaped carrier plate 175 and are arranged one behind the other parallel to the hydraulic cylinder 110. This in turn is bolted with its shorter leg to the base plate 170.

The servomotor 131 used in the described embodiment example is a motor of the type AM 8072 from the manufacturer Beckhoff Automation, Verl, Germany. It is controlled by an AX 5112 drive amplifier from the same manufacturer.

The axial piston pump 140 used in the embodiment described is a pump of the type AXFM/18, from Bucher Hydraulics, Klettgau-Griessen, Germany. It is an axial piston pump with a swash plate acting on both sides of several pistons. It can be operated in all four quadrants, even at speeds of 1 rpm or less. The maximum speed is 5'000 rpm, the displacement is 18 $cm^3$/rev. The maximum nominal pressure is 450 bar (in each case according to data sheet 03.2019).

The hydraulic cylinder 110 has a piston diameter of 150 mm, a piston rod diameter of 100 mm and a stroke of 800 mm. The maximum feed rate is 20 mm/s, and the maximum load is 250 kN.

The valve block 150 connects the axial piston pump 140 with the hydraulic cylinder 110 and the compensating reservoir 160. Pressure relief valves in cartridge design are also arranged on it (see FIG. 5).

Figure 5:
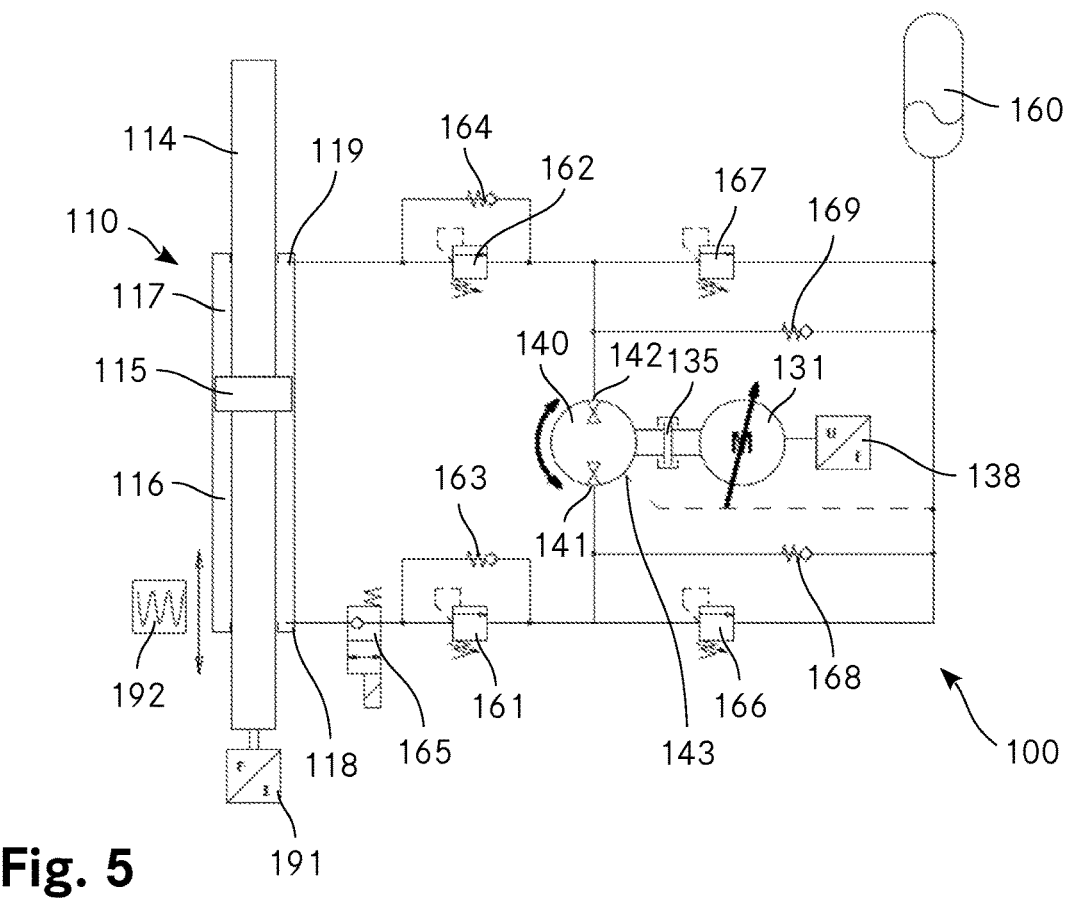
FIG. 5 depicts a hydraulic diagram of the load application unit.

FIG. 5 shows a hydraulic diagram of the load application unit 100. The axial piston pump 140 is driven by the servomotor 131 via a coupling 135. The latter is fed by the drive amplifier 138. The axial piston pump 140 is connected by its pressure connections 141, 142 to the connections 118, 119 of the two cylinder chambers 116, 117 of the hydraulic cylinder 110. An adjustable pressure relief valve 161, 162 is arranged in each of the connecting lines. These limit the pressure in the line from the respective cylinder chamber 116, 117 to the axial piston pump 140. In the opposite direction, the hydraulic fluid can flow freely thanks to check valves 163, 164 arranged parallel to the pressure relief valves 161, 162. A controllable valve 165 is also arranged in the line between pressure connection 141 of the axial piston pump 140 and connection 118 of the lower cylinder chamber 116, which can be used to prevent backflow from the cylinder chamber 116 to the axial piston pump 140.

The pressure connections 141, 142 of the axial piston pump 140 are also connected to the compensating reservoir 160, again via adjustable pressure relief valves 166, 167, which limit the pressure in the line from the axial piston pump 140 to the compensating reservoir 160. In the opposite direction, the hydraulic fluid can flow freely thanks to check valves 168, 169 arranged parallel to the pressure relief valves 166, 167.

Finally, the axial piston pump 140 is also connected to the compensating reservoir 160 via a leakage connection 143.

A force measuring unit 191 in the form of a load cell is arranged at the lower end of the hydraulic cylinder 110, which measures the force exerted by the hydraulic cylinder 110 and transmits it to a control system. Also arranged on the hydraulic cylinder 110 is a length measuring unit 192, which determines the current position of the piston 115 or piston rod 114 and also transmits it to the control system.

Figure 6:
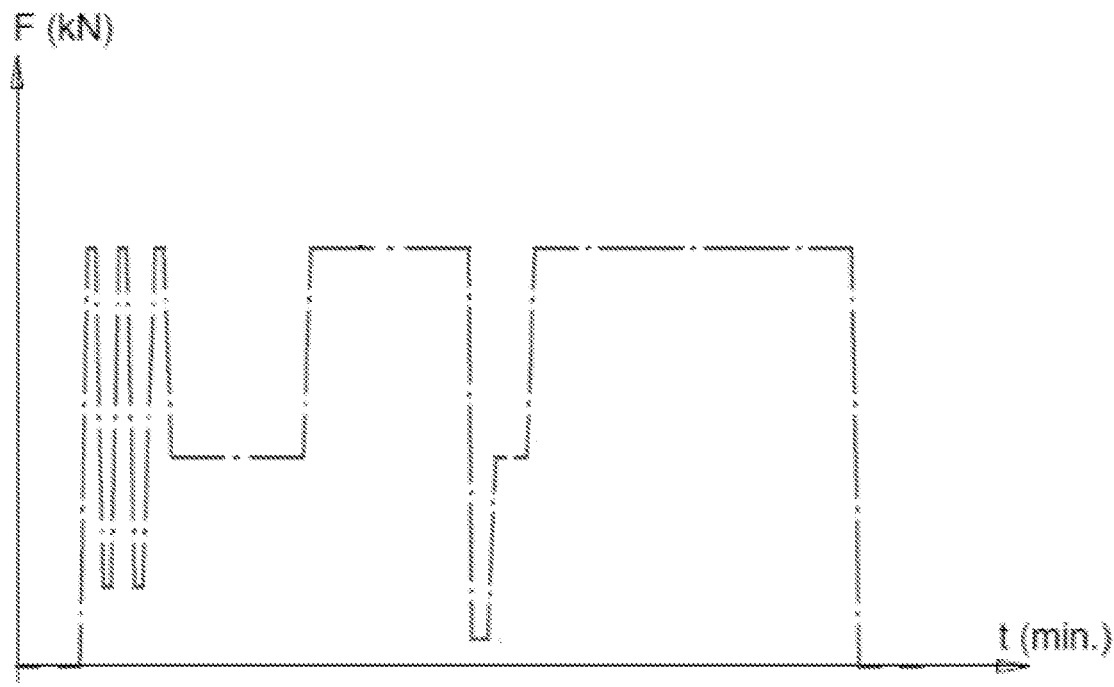
FIG. 6 depicts a representation of the force curve during a test procedure with the bogie test rig according to the invention.

FIG. 6 is a representation of the force cycle during a test procedure with the bogie test rig according to the invention. The cycle shown is divided into the following phases:

| Phase | Start [min] | End [min] | Actions |
| --- | --- | --- | --- |
| Feed | 0 | 3 | Feeding and positioning the bogie |
| Condition | 3 | 6 | Oscillations between 15 and 150 kN, frequency 1 Hz |
| Geometry check | 6 | 16 | 1st phase at 75 kN, 2nd phase at 150 kN |
| Air spring test | 16 | 27 | 1st phase at 5 kN, 2nd phase at 75 kN, 3rd phase at 150 kN |
| Remove | 27 | 3 | Deploying the bogie |

During conditioning, the components of the bogie, in particular those made of elastomeric materials, are rolled through and brought to a condition that corresponds to a normal operating condition during use in railroad operations. The two substeps of the test correspond to those of common test methods.

For the test, the hydraulic cylinder 110 moves to a defined position based on the signals from the length measuring unit 192. Subsequently, the force setpoints are approached in a force-controlled manner using the signals from the force measuring unit 191.

To compare the load application unit according to the invention with known variants, the described cycle was used as a test cycle, whereby only just three oscillations with low frequency were carried out as part of the conditioning process, because higher frequencies were not achievable for the purely hydraulic load application unit. The results of a one-hour test run were as follows:

|  | Hydraulic LAU | electric LAU | LAU according to the invention |
| --- | --- | --- | --- |
| Connected load [kW] | 7.5 | 8.0 | 4.5 |
| Total energy demand -[kWh] | 2.35 | 1.80 | 0.85 |
| max. noise development [dB(A)] | 75 | 70 | 65 |
| Efficiency | 0.7 | 0.6 | 0.85 |

The load application unit according to the invention thus has a significantly lower energy requirement. It is also characterized by low noise emission.

The invention is not limited to the illustrated embodiment. In particular, individual components of the system may be designed differently, and the geometrical arrangement of the elements of the load application unit and the mounting of the load application unit on the test rig may be designed differently.

In summary, the invention creates a test stand for testing bogies that is cost and energy efficient. The scope of protection of the present invention is given by the claims and is not limited by the features illustrated in the description or shown in the figures.

What is claimed is:

1. A test stand for testing bogies of rail vehicles, the test stand comprising:
    a load application unit configured to generate a linear application force for a bogie to be tested, the load application unit comprising a hydraulic cylinder with a piston rod,
    a transmission unit configured to transmit the application force to the bogie, the transmission unit arranged operatively connected to one end of the piston rod, wherein
    the hydraulic cylinder is a double-acting cylinder whose cylinder chambers are pressurized with hydraulic fluid by a bi-directional axial piston pump,
    wherein the piston rod arranged to extend on both sides of the piston and is supported at both longitudinal ends of the cylinder housing regardless of an extension state.

2. The test stand according to claim 1, wherein the axial piston pump and the hydraulic cylinder together with a compensating reservoir are configured and arranged to form a closed hydraulic system.

3. The test stand according to one of claim 1, wherein the axial piston pump is driven by a servomotor.

4. The test stand according to claim 1, further comprising two load application units configured to generate vertical application forces and arranged on a cross member so as to be displaceable relative to one another along a horizontal axis.

5. A method for testing bogies using the test stand according to claim 1, comprising the steps of:
    providing the load application unit configured to generate a linear application force for a bogie to be tested,
    providing the transmission unit configured to transmit the application force to the bogie,
    deflecting the bogie is in and out several times by application forces of a load application unit in order to condition spring and/or damper elements for a test, and
    subsequently subjecting the bogie to at least one testing step.

6. The method according to claim 5, wherein the springing deflecting in and out occurs at a frequency of 1 Hz or more.

7. The method according to claim 5, wherein at least 10 spring-in and spring-out operations are performed before the at least one testing step.

8. The method according to claim 5, wherein the application forces for springing in and springing out are at least 70% of maximum application forces in the subsequent at least one testing step.

9. A test stand for testing bogies of rail vehicles, the test stand comprising:
    a load application unit configured to generate a linear application force for a bogie to be tested, the load application unit comprising a hydraulic cylinder with a piston rod,
    a transmission unit configured to transmit the application force to the bogie, the transmission unit arranged operatively connected to one end of the piston rod, wherein
    the hydraulic cylinder is a double-acting cylinder whose cylinder chambers are pressurized with hydraulic fluid by a bi-directional axial piston pump,
    wherein the axial piston pump comprises a swash plate arranged to cooperate on both sides with several pistons.

10. A test stand for testing bogies of rail vehicles, the test stand comprising:
- a load application unit configured to generate a linear application force for a bogie to be tested, the load application unit comprising a hydraulic cylinder with a piston rod,
- a transmission unit configured to transmit the application force to the bogie, the transmission unit arranged operatively connected to one end of the piston rod, wherein
- the hydraulic cylinder is a double-acting cylinder whose cylinder chambers are pressurized with hydraulic fluid by a bi-directional axial piston pump,
- a length measuring device and a force measuring device arranged on the hydraulic cylinder;
- a drive control device connected to the length measuring device and the force measuring device, the control device configured to receive measuring signals;
- the drive control device connected to a servomotor and configured to transmit control signals; and
- the drive control device configured to be controlled such that the control signals are generated as a function of the measuring signals.

\* \* \* \* \*